US008388437B2

(12) United States Patent
Nicely et al.

(10) Patent No.: US 8,388,437 B2
(45) Date of Patent: Mar. 5, 2013

(54) GAMING SYSTEM, GAMING DEVICE AND METHOD FOR PROVIDING AN AWARD BASED ON AN OUTCOME COUNTER

(75) Inventors: Mark C. Nicely, Daly City, CA (US); Kathleen Bolich, Davis, CA (US)

(73) Assignee: IGT, Reno, NV (US)

( * ) Notice: Subject to any disclaimer, the term of this patent is extended or adjusted under 35 U.S.C. 154(b) by 82 days.

(21) Appl. No.: 13/178,246

(22) Filed: Jul. 7, 2011

(65) Prior Publication Data

US 2011/0269523 A1 Nov. 3, 2011

Related U.S. Application Data

(63) Continuation of application No. 10/993,402, filed on Nov. 18, 2004, now Pat. No. 8,002,620.

(60) Provisional application No. 60/523,234, filed on Nov. 18, 2003.

(51) Int. Cl.
*G06F 17/00* (2006.01)

(52) U.S. Cl. ................. 463/20; 463/16; 463/17; 463/18

(58) Field of Classification Search ............... 463/16–20
See application file for complete search history.

(56) References Cited

U.S. PATENT DOCUMENTS

| | | | | |
|---|---|---|---|---|
| 1,527,929 | A | | 2/1925 | Simons |
| 2,545,644 | A | | 3/1951 | Benton et al. |
| 3,975,022 | A | | 8/1976 | Figueroa |
| 4,051,939 | A | | 10/1977 | Murphy et al. |
| 4,182,515 | A | | 1/1980 | Nemeth |
| 4,410,178 | A | | 10/1983 | Partridge |
| 4,448,419 | A | | 5/1984 | Telnaes |
| 4,508,353 | A | | 4/1985 | Meyer et al. |
| 4,624,459 | A | | 11/1986 | Kaufman |
| 4,695,053 | A | | 9/1987 | Vazquez, Jr. et al. |
| 4,732,386 | A | | 3/1988 | Rayfiel |
| 4,775,155 | A | | 10/1988 | Lees |
| 4,861,041 | A | * | 8/1989 | Jones et al. .................. 273/292 |
| 4,964,638 | A | | 10/1990 | Ishida |
| 4,991,848 | A | | 2/1991 | Greenwood et al. |
| 5,046,737 | A | | 9/1991 | Fienberg |
| 5,058,893 | A | | 10/1991 | Dickinson et al. |
| 5,072,946 | A | | 12/1991 | Miller |

(Continued)

FOREIGN PATENT DOCUMENTS

| | | |
|---|---|---|
| DE | 476586 | 3/1930 |
| DE | 3 242 890 | 5/1984 |

(Continued)

OTHER PUBLICATIONS

Letter from Marvin A. Motsenbocker of Mots Law dated Jan. 3, 2012, regarding Third Party Submission in Publication Application Under C.F.R. 1.99 filed for U.S. Appl. No. 13/178,246 (1 page).

(Continued)

*Primary Examiner* — Michael Cuff
(74) *Attorney, Agent, or Firm* — Neal, Gerber & Eisenberg LLP

(57) ABSTRACT

Methods and apparatus for providing an award based on a multiplicity of game outcomes. In one implementation the invention provides a method for providing a game. The method includes placing a bet by a player, playing of a game to produce a game outcome, evaluating a primary game outcome, paying a direct award if the primary outcome merits it, advancing a bonus accumulator if the primary outcome merits it, and if the bonus accumulator has advanced sufficiently, paying a bonus award to the player and clearing the bonus accumulator.

40 Claims, 13 Drawing Sheets

U.S. PATENT DOCUMENTS

| | | | |
|---|---|---|---|
| 5,116,055 A | 5/1992 | Tracy | |
| 5,152,529 A | 10/1992 | Okada | |
| 5,205,555 A | 4/1993 | Humano | |
| 5,324,041 A | 6/1994 | Boylan et al. | |
| 5,342,047 A | 8/1994 | Heidel et al. | |
| 5,364,100 A | 11/1994 | Ludlow et al. | |
| 5,380,007 A | 1/1995 | Travis et al. | |
| 5,395,111 A | 3/1995 | Inoue | |
| 5,411,271 A | 5/1995 | Mirando | |
| 5,423,539 A | 6/1995 | Nagao | |
| 5,449,173 A | 9/1995 | Thomas et al. | |
| 5,456,465 A | 10/1995 | Durham | |
| 5,501,455 A | 3/1996 | Hirata et al. | |
| 5,511,781 A | 4/1996 | Wood et al. | |
| 5,515,486 A | 5/1996 | Amro et al. | |
| 5,531,441 A | 7/1996 | Dabrowski et al. | |
| 5,536,016 A | 7/1996 | Thompson | |
| 5,542,669 A | 8/1996 | Charron et al. | |
| 5,560,603 A | 10/1996 | Seelig et al. | |
| 5,570,885 A | 11/1996 | Ornstein | |
| 5,584,763 A | 12/1996 | Kelly et al. | |
| 5,607,162 A | 3/1997 | Boylan et al. | |
| 5,611,535 A | 3/1997 | Tiberio | |
| 5,664,998 A | 9/1997 | Seelig et al. | |
| 5,707,285 A | 1/1998 | Place et al. | |
| 5,711,525 A | 1/1998 | Breeding | |
| 5,722,891 A | 3/1998 | Inoue | |
| 5,769,716 A | 6/1998 | Saffari et al. | |
| 5,772,509 A | 6/1998 | Weiss | |
| 5,788,573 A | 8/1998 | Baerlocher et al. | |
| 5,788,574 A | 8/1998 | Ornstein et al. | |
| 5,823,872 A | 10/1998 | Prather et al. | |
| 5,823,874 A | 10/1998 | Adams | |
| D400,597 S | 11/1998 | Hedrick et al. | |
| 5,833,538 A | 11/1998 | Weiss | |
| D402,702 S | 12/1998 | Seelig et al. | |
| 5,848,932 A | 12/1998 | Adams | |
| 5,851,147 A | 12/1998 | Stupak et al. | |
| 5,851,148 A | 12/1998 | Brune et al. | |
| 5,855,514 A | 1/1999 | Kamille | |
| 5,873,781 A | 2/1999 | Keane | |
| D406,865 S | 3/1999 | Heidel | |
| 5,882,261 A | 3/1999 | Adams | |
| 5,902,184 A | 5/1999 | Bennett | |
| 5,911,418 A | 6/1999 | Adams | |
| 5,919,091 A | 7/1999 | Bell et al. | |
| 5,927,714 A | 7/1999 | Kaplan | |
| 5,935,002 A | 8/1999 | Falciglia | |
| 5,944,314 A | 8/1999 | Stavinsky | |
| 5,947,820 A | 9/1999 | Morro et al. | |
| 5,947,821 A * | 9/1999 | Stone | 463/13 |
| 5,951,397 A | 9/1999 | Dickinson | |
| 5,976,015 A | 11/1999 | Seelig et al. | |
| 5,980,384 A | 11/1999 | Barrie | |
| 5,984,781 A | 11/1999 | Sunaga | |
| 5,988,643 A | 11/1999 | Awada | |
| 5,989,121 A | 11/1999 | Sakamoto | |
| 5,996,997 A | 12/1999 | Kamille | |
| 5,997,400 A | 12/1999 | Seelig et al. | |
| 5,997,401 A | 12/1999 | Crawford | |
| 6,004,207 A | 12/1999 | Wilson, Jr. et al. | |
| 6,015,346 A | 1/2000 | Bennett | |
| 6,019,369 A | 2/2000 | Nakagawa et al. | |
| 6,024,642 A | 2/2000 | Stupak | |
| 6,033,306 A | 3/2000 | De Souza | |
| 6,033,307 A | 3/2000 | Vancura | |
| 6,039,649 A | 3/2000 | Schulze | |
| 6,053,813 A | 4/2000 | Mathis | |
| 6,056,642 A | 5/2000 | Bennett | |
| 6,059,289 A | 5/2000 | Vancura | |
| 6,059,658 A | 5/2000 | Mangano et al. | |
| 6,086,066 A | 7/2000 | Takeuchi et al. | |
| 6,089,976 A | 7/2000 | Schneider et al. | |
| 6,089,977 A | 7/2000 | Bennett | |
| 6,089,978 A | 7/2000 | Adams | |
| 6,102,400 A * | 8/2000 | Scott et al. | 273/269 |
| 6,102,402 A | 8/2000 | Scott et al. | |
| 6,102,798 A | 8/2000 | Bennett | |
| 6,105,962 A | 8/2000 | Malavazos et al. | |
| 6,113,098 A | 9/2000 | Adams | |
| 6,126,542 A | 10/2000 | Fier | |
| 6,129,355 A | 10/2000 | Hahn et al. | |
| 6,135,884 A | 10/2000 | Hedrick et al. | |
| 6,142,873 A | 11/2000 | Weiss et al. | |
| 6,142,874 A | 11/2000 | Kodachi et al. | |
| 6,149,521 A | 11/2000 | Sanduski | |
| 6,155,925 A | 12/2000 | Giobbi et al. | |
| 6,159,097 A | 12/2000 | Gura | |
| 6,159,098 A | 12/2000 | Slomiany et al. | |
| 6,162,121 A | 12/2000 | Morro et al. | |
| 6,164,652 A | 12/2000 | Lauretta et al. | |
| 6,168,520 B1 | 1/2001 | Baerlocher et al. | |
| 6,168,523 B1 | 1/2001 | Piechowiak et al. | |
| 6,173,955 B1 | 1/2001 | Perrie et al. | |
| 6,174,234 B1 | 1/2001 | Seibert, Jr. et al. | |
| 6,174,235 B1 | 1/2001 | Walker et al. | |
| 6,190,254 B1 | 2/2001 | Bennett | |
| 6,190,255 B1 | 2/2001 | Thomas et al. | |
| 6,203,429 B1 | 3/2001 | Demar et al. | |
| 6,203,430 B1 | 3/2001 | Walker et al. | |
| D441,031 S | 4/2001 | Seelig et al. | |
| 6,213,876 B1 | 4/2001 | Moore, Jr. | |
| 6,220,593 B1 | 4/2001 | Pierce et al. | |
| 6,224,483 B1 | 5/2001 | Mayeroff | |
| 6,227,969 B1 | 5/2001 | Yoseloff | |
| 6,227,970 B1 | 5/2001 | Shimizu et al. | |
| 6,227,971 B1 | 5/2001 | Weiss | |
| 6,231,442 B1 | 5/2001 | Mayeroff | |
| 6,234,897 B1 | 5/2001 | Frohm et al. | |
| D443,313 S | 6/2001 | Brettschneider | |
| 6,251,013 B1 | 6/2001 | Bennett | |
| 6,254,481 B1 | 7/2001 | Jaffe | |
| 6,261,177 B1 | 7/2001 | Bennett | |
| 6,267,669 B1 | 7/2001 | Luciano, Jr. et al. | |
| 6,270,411 B1 | 8/2001 | Gura et al. | |
| 6,279,910 B1 | 8/2001 | de Keller | |
| 6,287,197 B1 | 9/2001 | Dickinson et al. | |
| 6,299,165 B1 | 10/2001 | Nagano | |
| 6,302,790 B1 | 10/2001 | Brossard | |
| 6,305,686 B1 | 10/2001 | Perrie et al. | |
| 6,309,300 B1 | 10/2001 | Glavich | |
| 6,312,334 B1 | 11/2001 | Yoseloff | |
| 6,315,660 B1 | 11/2001 | DeMar et al. | |
| 6,315,663 B1 | 11/2001 | Sakamoto | |
| 6,315,664 B1 | 11/2001 | Baerlocher et al. | |
| 6,322,309 B1 | 11/2001 | Thomas et al. | |
| 6,336,860 B1 | 1/2002 | Webb | |
| 6,336,863 B1 | 1/2002 | Baerlocher et al. | |
| 6,340,158 B2 | 1/2002 | Pierce et al. | |
| 6,346,043 B1 | 2/2002 | Colin et al. | |
| 6,347,996 B1 | 2/2002 | Gilmore et al. | |
| 6,364,767 B1 | 4/2002 | Brossart et al. | |
| 6,368,216 B1 | 4/2002 | Hedrick et al. | |
| 6,368,218 B2 | 4/2002 | Angell, Jr. | |
| 6,386,974 B1 | 5/2002 | Adams | |
| 6,398,220 B1 | 6/2002 | Inoue | |
| 6,398,644 B1 | 6/2002 | Perrie et al. | |
| 6,398,645 B1 | 6/2002 | Yoseloff | |
| 6,409,172 B1 | 6/2002 | Vancura | |
| 6,419,579 B1 | 7/2002 | Bennett et al. | |
| 6,435,500 B2 | 8/2002 | Gumina | |
| 6,439,995 B1 | 8/2002 | Hughs-Baird et al. | |
| 6,443,837 B1 * | 9/2002 | Jaffe et al. | 463/16 |
| 6,461,241 B1 | 10/2002 | Webb et al. | |
| D465,531 S | 11/2002 | Luciano, Jr. et al. | |
| 6,474,649 B1 * | 11/2002 | Kennedy et al. | 273/304 |
| 6,481,713 B2 | 11/2002 | Perrie et al. | |
| 6,494,785 B1 | 12/2002 | Gerrard et al. | |
| 6,511,375 B1 | 1/2003 | Kaminkow | |
| 6,533,660 B2 | 3/2003 | Seelig et al. | |
| 6,537,152 B2 | 3/2003 | Seelig et al. | |
| 6,561,902 B1 | 5/2003 | Walker et al. | |
| 6,569,015 B1 | 5/2003 | Baerlocher et al. | |
| 6,572,471 B1 | 6/2003 | Bennett | |
| 6,582,307 B2 | 6/2003 | Webb | |
| 6,592,457 B1 | 7/2003 | Frohm et al. | |
| 6,595,854 B2 | 7/2003 | Hughs-Baird et al. | |

| | | | | |
|---|---|---|---|---|
| 6,602,136 | B1 | 8/2003 | Baerlocher et al. | |
| 6,609,972 | B2 | 8/2003 | Seelig et al. | |
| 6,645,074 | B2 | 11/2003 | Thomas et al. | |
| 6,648,757 | B1 | 11/2003 | Slomiany et al. | |
| 6,669,559 | B1 | 12/2003 | Baerlocher et al. | |
| 6,676,516 | B2 | 1/2004 | Baerlocher et al. | |
| 6,712,694 | B1 | 3/2004 | Nordman | |
| 6,729,620 | B2 * | 5/2004 | Jones | 273/292 |
| 6,749,502 | B2 | 6/2004 | Baerlocher | |
| 6,783,457 | B2 | 8/2004 | Hughs-Baird et al. | |
| 6,786,820 | B2 | 9/2004 | Gerrard et al. | |
| 6,796,900 | B2 | 9/2004 | Baerlocher et al. | |
| 6,802,773 | B2 | 10/2004 | Moody | |
| 6,808,454 | B2 | 10/2004 | Gerrard et al. | |
| 6,857,958 | B2 | 2/2005 | Osawa | |
| 6,863,606 | B1 | 3/2005 | Berg et al. | |
| 6,878,061 | B2 | 4/2005 | Baerlocher et al. | |
| 6,908,383 | B2 | 6/2005 | Baerlocher et al. | |
| 7,033,270 | B2 | 4/2006 | Baerlocher et al. | |
| 7,121,943 | B2 | 10/2006 | Webb et al. | |
| 7,326,110 | B2 | 2/2008 | Webb et al. | |
| 7,335,102 | B2 | 2/2008 | Baerlocher et al. | |
| 2002/0010018 | A1 | 1/2002 | Lemay et al. | |
| 2002/0025847 | A1 | 2/2002 | Thomas et al. | |
| 2002/0034974 | A1 | 3/2002 | Wood et al. | |
| 2002/0095836 | A1 | 7/2002 | Segan et al. | |
| 2002/0137559 | A1 | 9/2002 | Baerlocher | |
| 2002/0155881 | A1 | 10/2002 | Yoshida | |
| 2002/0187825 | A1 * | 12/2002 | Tracy et al. | 463/17 |
| 2003/0027625 | A1 * | 2/2003 | Rowe | 463/20 |
| 2003/0027626 | A1 | 2/2003 | Marks et al. | |
| 2003/0228899 | A1 * | 12/2003 | Evans | 463/25 |
| 2003/0236115 | A1 | 12/2003 | Chamberlain | |
| 2004/0014515 | A1 * | 1/2004 | Tracy et al. | 463/17 |
| 2004/0087357 | A1 * | 5/2004 | Johnson | 463/17 |
| 2004/0087359 | A1 | 5/2004 | Cuddy et al. | |
| 2004/0097282 | A1 | 5/2004 | Baerlocher et al. | |
| 2004/0116179 | A1 | 6/2004 | Nicely et al. | |
| 2004/0152511 | A1 * | 8/2004 | Nicely et al. | 463/27 |
| 2004/0248647 | A1 | 12/2004 | Rothschild et al. | |
| 2004/0248648 | A1 | 12/2004 | Rothschild et al. | |
| 2005/0003880 | A1 * | 1/2005 | Englman et al. | 463/16 |
| 2005/0020338 | A1 * | 1/2005 | Stein | 463/11 |
| 2005/0051958 | A1 * | 3/2005 | Snow | 273/274 |
| 2005/0059472 | A1 * | 3/2005 | Joshi et al. | 463/20 |
| 2005/0153769 | A1 | 7/2005 | Casey et al. | |
| 2005/0233796 | A1 | 10/2005 | Baerlocher et al. | |
| 2007/0060272 | A1 | 3/2007 | Webb et al. | |
| 2007/0135193 | A1 | 6/2007 | Nicely | |

FOREIGN PATENT DOCUMENTS

| | | | |
|---|---|---|---|
| EP | 0 688 008 | | 12/1995 |
| EP | 0 840 264 | | 6/1998 |
| EP | 0 874 337 | | 10/1998 |
| EP | 0 886 250 | | 12/1998 |
| EP | 0 921 503 | | 6/1999 |
| EP | 0 945 837 | | 9/1999 |
| EP | 0 984 408 | | 3/2000 |
| EP | 0 984 409 | | 3/2000 |
| FR | 811 060 | | 4/1937 |
| GB | 912685 | | 12/1962 |
| GB | 1 202 691 | | 3/1967 |
| GB | 1 262 134 | | 2/1972 |
| GB | 2 090 690 | | 7/1982 |
| GB | 2 117 155 | | 10/1983 |
| GB | 2 170 636 | | 8/1986 |
| GB | 2 183 882 | | 6/1987 |
| GB | 2 262 642 | | 6/1993 |
| GB | 2 268 415 | | 12/1994 |
| GB | 2 295 043 | | 5/1996 |
| GB | 2 335 524 | | 9/1999 |
| GB | 2 353 128 | | 2/2001 |
| GB | 2 393 021 | | 3/2004 |
| GB | 2 396 566 | | 6/2004 |
| JP | 10-179923 | A | 7/1998 |
| JP | 2002-085811 | A | 3/2002 |
| JP | 2002-336415 | A | 11/2002 |
| JP | 06-277332 | A | 10/2006 |
| RU | 17678 | U1 | 4/2001 |
| WO | WO 93/03464 | | 2/1993 |
| WO | WO 97/27570 | | 7/1997 |
| WO | WO 9732285 | | 9/1997 |
| WO | WO 00/12186 | | 3/2000 |
| WO | WO 01/34261 | | 5/2001 |
| WO | WO 03/083795 | | 10/2003 |
| WO | WO 05/028045 | | 3/2005 |

OTHER PUBLICATIONS

Third Party Submission in Published Application Under 37 C.F.R. 1.99 filed for U.S. Appl. No. 13/178,246, dated Jan. 3, 2012 (3 pages).

Partially-highlighted U.S. Patent No. 4,964,638 submitted with Third Party Submission in Published Application Under 37 C.F.R. 1.99 for U.S. Appl. No. 13/178,246 (2 pages).

Partially-highlighted JP06-277332A and English translation of paragraphs [0039] of same submitted with Third party Submission in Published Application Under 37 C.F.R. 1.99 for U.S. Appl. No. 13/178,246 (6 pages).

Partially-highlighted JP10-179923A and English translation of paragraphs [0087] to [0089] of same submitted with Third Party Submission in Published Application Under 37 C.F.R. 1.99 for U.S. Appl. No. 13/178,246 (5 pages).

Partially-highlighted JP2002-336415A and English translation of paragraph [0008] of same submitted with Third Party Submission in Published Application Under 37 C.F.R. 1.99 for U.S. Appl. No. 13/178,246 (4 pages).

Partially-highlighted JP2002-085811A and English translation of paragraph [0008] of same submitted with Third Party Submission in Published Application Under 37 C.F.R. 1.99 for U.S. Appl. No. 13/178,246 (3 pages).

* cited by examiner

FIG. 5
WIN UP TO
500,000
Banana-Rama
Match Three
skybet
vegas
SIGN UP
NOW
Balance:
2996.00
REAL PLAY
OPEN ACCOUNT
PAY TABLE
GAME RULES
RESPONSIBLE
GAMING
EXIT GAME
(( AUDIO ON ))
PLAY AGAIN?
PAID
LAST BET 1
CLICK "PLAY" TO START THE GAME
AUTO
PLAY

FIG. 8
Sky - Bananarama Match 3 500K - Microsoft Internet Explorer
MATCH 3
TO WIN UP TO
500,000
Banana-Rama
Match Three
MYSTERY-RAMA!!!
skybet
vegas
FREE £20
CLICK
HERE
Balance:
2963.00
REAL PLAY
OPEN ACCOUNT
PAY TABLE
GAME RULES
RESPONSIBLE GAMING
EXIT GAME
(( AUDIO OFF ))
TAKE WIN?
TAKE WIN OR RISK IT?
Free
PAID
LAST BET 1
CLICK "TAKE WIN" TO COLLECT 6
AUTO
PLAY

GAMING SYSTEM, GAMING DEVICE AND METHOD FOR PROVIDING AN AWARD BASED ON AN OUTCOME COUNTER

PRIORITY CLAIM

This application is a continuation application of, claims priority to and the benefit of U.S. patent application Ser. No. 10/993,402, filed on Nov. 18, 2004, which claims priority to and the benefit of U.S. Provisional Patent Application Ser. No. 60/523,234, filed on Nov. 18, 2003, the entire contents of which are each incorporated by reference herein.

BACKGROUND

The present invention relates to casino gaming.

There are various casino games, including slot games and card games.

In general, a game consists of the placing of one or more wagers (if more than one wager from a player are permitted by rules of the game), having the game play out according to rules of the game, and determining whether and what to award a participating player. The determination is usually based, in part, upon one or more game outcomes. There is usually one outcome per wager placed by the player in the game.

A game typically involves one or more variable elements that become fixed, usually by rules of the game, at a conclusion of the game when the above-described determination is made. The cards a poker player holds are examples of such game elements. The cards can be exchanged for other cards during the game. At the conclusion of the game, the cards are no longer exchangeable. The particular combination of the game elements when they are fixed, e.g., a particular combination of the cards the poker player holds at the end of a poker game, is referred to in the instant application as a game outcome, which can also be referred to as a game event or a primary game outcome. A game outcome in video poker, by way of example, is based on the combination of five cards that can be classified into defined categories, for example, Royal Flush, Straight Flush, Four of a Kind, Full House, Flush, Straight, Three of a Kind, Two Pair, High Pair (Jacks or better), Low Pair (Tens or Less), and High Card. In some versions of video poker, a game outcome of High Pair of Jacks or Better is required to earn an award. In other versions of video, a different pay model may define Three of a Kind as the lowest award-paying game outcome. The symbols on the reels of a slot machine are other examples of the variable elements. The combination of symbols that end up on a pay line of the slot machine after a pull, for example, is a game outcome.

Determining whether and what to award usually includes determining if a game outcome satisfies criteria defined by a game's pay model. The latter can be, for example, a determination of whether the cards in a hand of video poker game match a pattern required for a pay or, alternatively, a determination of whether the arrangement of symbols along a pay line of a slot game matches a pattern required for a pay.

Slot games and card games have undergone numerous increases in depth of play via the addition of bonus events and similar improvements. A bonus event involves the specification or selection of an award amount different from the main or primary game. Such a bonus award can include a variable sized award, a progressive award, and an award determined through a play mechanism much different from the main game play mechanism.

Bonus events can be triggered based upon a single game, or based upon a series of games, or a combination of the two based upon the game rules. When based upon a series of games, a mechanism known as a bonus accumulator can be used to keep track of how far the bonus advancement series has progressed.

Existing casino games trigger an immediate bonus or advance a bonus accumulator based upon a secondary game outcome. Unlike the above-described game outcome, a secondary game outcome usually involves only a portion of the variable elements of the game or sometimes even game elements that are completely separate than those used for determining the primary game outcome. By way of example, a video poker game outcome is the combination of the player's final five cards, from which the above-described determination is made in view of a game-defined categorization of poker hands. In contrast, a secondary outcome is used for the purpose of bonus triggering or bonus advancement and might involve independent or semi-dependent criteria from the primary game outcome, for example, whether a one-eyed jack was in the hand, whether two jokers were in the hand, or whether the hand only had more black cards than red cards. A bonus trigger or bonus advancement in a video poker game can also be supported by game elements not at all related to the player's cards. In the video poker variation Multi-Strike Poker, for example, a bonus event which advanced the player to the next hand even if the player loses his current hand is a random occurring event unrelated to his actual cards. Another example would be a slot machine that determines whether the entire game outcome contains patterns of symbols which match the requirements for a reward. A secondary sub-portion of such a game outcome for the purpose of bonus or bonus advancement might include whether or not a special symbol appeared anywhere, perhaps not even along a pay line.

SUMMARY

The present invention provides methods and apparatus, including computer-program products, for providing an award based upon a multiplicity of game outcomes. The invention can be implemented in many ways, for example, as a physical table game, as a video game, as a networked game, or as an Internet-based game.

The awards can be based on achieving consecutive game outcomes. Alternatively, gaming awards can be based on achieving some number of non-consecutive game outcomes, for example, a particular combination of game outcomes within a specific number of attempts. Achieving a certain number of game outcomes, either consecutively or non-consecutively, can lead to a bonus round or a progressive award.

In another implementation, bonus awards or bonus round play can be achieved through reaching a specified number of game outcomes prior to some particular event or combination of events (e.g., a player reaching a specified number of outcomes prior to the dealer reaching a different number of game outcomes, or a player reaching a specified number of game outcomes in a particular number of attempts). Alternatively, a player can compete with other players, each player vying to be the first to achieve a particular event or combination of events. The competition can also be implemented with a number of players attempting to reach a number of game outcomes prior to the dealer reaching some different specified number of game outcomes.

In general, in one aspect, the invention provides a method for providing a game. The method includes placing a bet by a player, playing of a game to produce a game outcome, evaluating a primary game outcome, paying a direct award if the primary outcome merits it, advancing a bonus accumulator if the primary outcome merits it, and if the bonus accumulator has advanced sufficiently, paying a bonus award to the player and clearing the bonus accumulator.

Implementations of the invention can include one or more of the following advantageous features. The method can include a plurality of independent bonus accumulators that are available and independently evaluated and acted upon. The method can include a plurality of dependent bonus accumulators, the awarding of any one bonus award resetting all bonus accumulators. The methods can include a plurality of players that share a same accumulator.

In general, in one aspect, the invention provides a method for providing a game. The method includes placing a bet by a player, playing of a game to produce a game outcome, advancing a bonus attempt count, evaluating a primary outcome, paying a direct award if the primary outcome merits it, advancing a bonus accumulator if the primary outcome merits it, paying the player a bonus award if the bonus accumulator has sufficiently advanced, and resetting the bonus accumulator and the bonus attempt count if the player has been awarded a bonus award, or if the bonus attempt count has been exceeded. The method can include a plurality of players that share a same bonus accumulator and bonus attempt count.

In general, in one aspect, the invention provides an electronic device for playing a betting game. The device includes a processor, a display, a data structure operable to store data corresponding to a plurality of game elements for a game, and a means for a player to make a bet and initiate a game play. The processor can generate and evaluate a primary game outcome, pay an award to the player if the primary outcome merits it, advance a bonus accumulator if primary outcome merits it, and pay a bonus award to the player and clearing the bonus accumulator.

Implementations of the invention can include one or more of the following advantageous features. The device can include a plurality of independent bonus accumulators, the plurality of independent bonus accumulators being operable to be independently evaluated and acted upon. The device can include a plurality of dependent bonus accumulators, the awarding of any one bonus resetting the plurality of dependent bonus accumulators.

In general, in one aspect, the invention provides an electronic device for playing a betting game. The device includes a processor, a display, a data structure storing data corresponding to game elements for the game, a means for a player to make a bet and initiate a game play. The processor can advance a bonus attempt count, generate and evaluate a primary game outcome, pay an award to the player if the primary outcome merits it, advance a bonus accumulator if primary outcome merits it pay a bonus award to the player and clearing the bonus accumulator and the bonus attempt count if a bonus award is paid or if the bonus attempt count has been exceeded. A plurality of players sharing a same accumulator and bonus attempt count.

In general, in one aspect, the invention provides computer program product including instructions operable to cause a programmable processor to obtain a current game outcome, retrieve another game outcome, and determine whether a player receives an award, the determining being based on the current game outcome and the other game outcome.

The invention can be implemented to realize one or more of the following advantages. A system in accordance with the invention can provide increased gaming awards based on prior game play. An increased gaming award can be a progressive award.

Further, gaming awards can be predicated on either consecutive or non-consecutive prior outcomes. Additionally, the system provides for competition between many different players for bonus awards. The system can provide for competitions, e.g., race poker, that may induce players to change their strategy in order to improve their chances of forcing one kind of outcome over another such that their payback is reduced.

The details of one or more implementations of the invention are set forth in the description below. Other features and advantages of the invention will become apparent from the description.

BRIEF DESCRIPTION OF THE FIGURES

Like reference numbers and designations in the various drawings indicate like elements.

DETAILED DESCRIPTION

Methods and apparatus described can use a number of programmed components to determine awards based on a multiplicity of game outcomes. The features described can be applied to a wide variety of computer program applications in which awards can be based on multiple game outcomes. Examples of these applications include, but are not limited to, applications for computer-implemented card games and slot games. These applications can be executed on a stand-alone device and/or a networked device.

Figure 1:
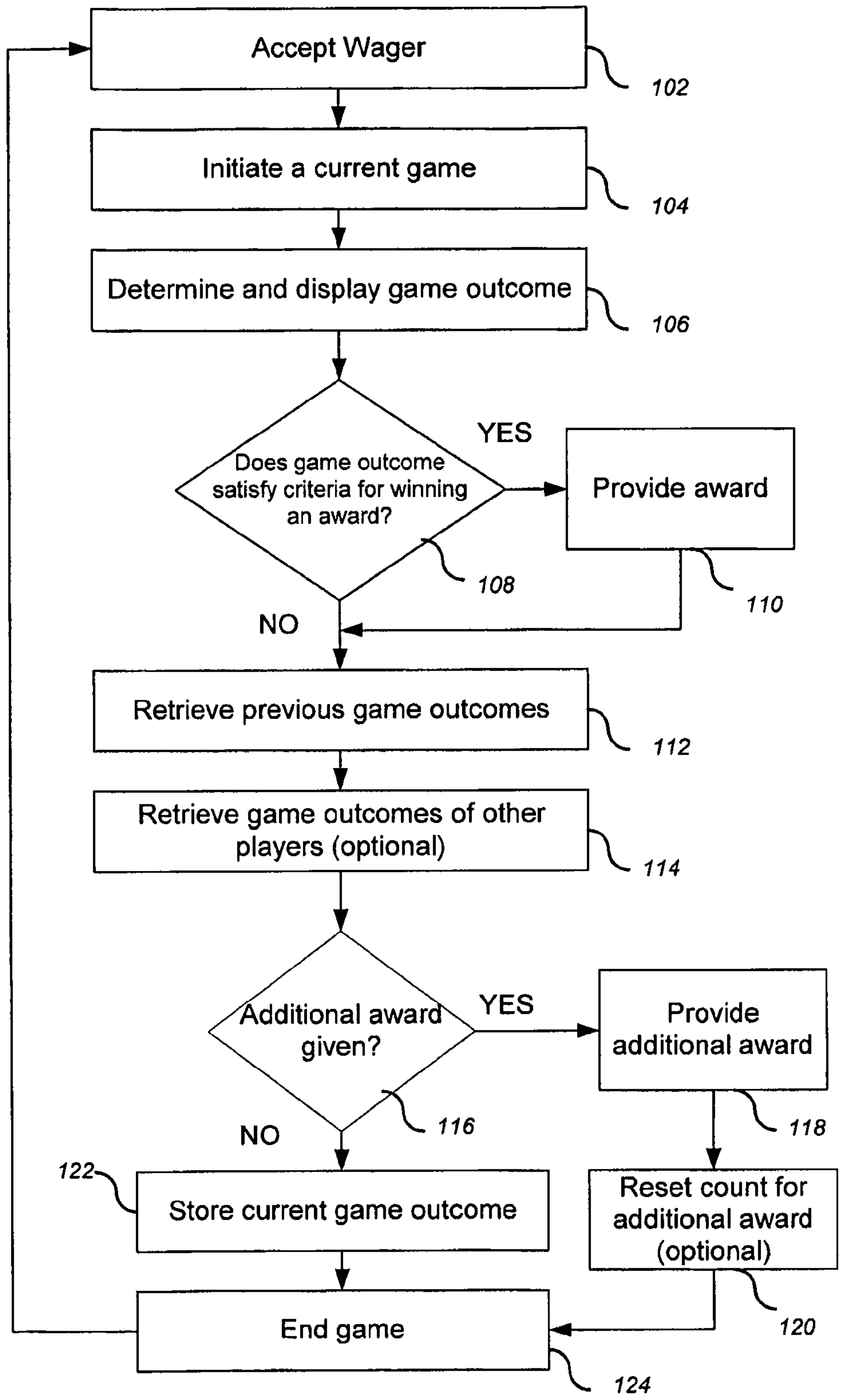
FIG. 1 shows a method 100 for providing an award based on a multiplicity of game outcomes.

FIG. 1 shows a method 100 for providing an award based on a multiplicity of game outcomes. A game device performing method 100 accepts one or more wagers from a player (step 102). More than one wager is accepted when rules of the game permit the player to place more than one wager for a game.

The device initiates a current game (step 104). The game initiated can be one selected by the player when there are multiple games provided by the device.

The device determines and displays one or more current game outcomes (step 106).

A game outcome is provided for each wager placed by the player. A game outcome can depend on one or more results of a random outcome generator. Examples of a random outcome generator include a deck of cards, a roulette wheel, dice, and a computer program driven by an engine that generates random or pseudo-random numbers.

For each game outcome, the device determines whether the game outcome satisfies a first set of criteria for winning an award (step 108). The award is usually, but not necessarily, money. The award can be, for example, a credit for playing the game. Criteria can be, for example, having a particular combination of cards or a particular combination of reel symbols on a pay line.

If at least one of the game outcomes satisfies criteria for winning an award, then the device gives the player an appropriate award (step 110). If none of the game outcomes satisfies criteria for an award, then the device retrieves previous game outcomes that the player obtained (step 112). The previous game outcomes can be stored on the device itself or, alternatively, a database accessible to the device. Optionally, the device obtains game outcomes of other players (step 114) The game outcomes of other players can be previous and/or current game outcomes. Obtaining game outcomes of other players is typically required in a game where multiple players compete for a common award, for example, race poker (described below) or where players play distinct main games but compete for a common bonus award, for example, a common progressive jackpot.

The device determines whether an additional award is to be given based on a multiplicity of game outcomes (step 116). The multiplicity of game outcomes usually includes the one or more game outcomes determined in step 106, the game outcomes retrieved in step 112, and optionally the game outcomes retrieved in step 114 The determination is made based on a set of criteria that is different from the first set of criteria. The additional award can be, for example, a bonus award that is based on criteria for giving bonus awards. If the device determines that the additional award is to be given, then the device gives the player the additional award (step 118). The additional award can be an advancement of a bonus award accumulator. Optionally, the device resets a count being maintained for the additional award (step 120). The count can be a count for a bonus award accumulator. If the device determines that no additional award is to be given to the player, then the device stores the current game outcome (step 122) and ends the game (step 124).

FIGS. 2-8 are screen shots of an example of computer-implemented game that provides an award based on a multiplicity of game outcomes. The outcome of the game (i.e., the game outcome) is a set of three matching symbols revealed by the player. (At the start of the game all symbols are hidden. The player reveals a hidden symbol by selecting the symbol.) The player reveals symbols until there are three matching symbols. If the three matching symbols form a combination for which there is an award, the player is given the award. The award is indicated by the number of the matching symbols. If the three matching symbols are the chimp symbols or the ape symbols, this is normally a losing game outcome. However, such a game outcome has the secondary effect of changing the player's bonus standing. In this game, there is a bonus accumulator, depicted as spots along the palm tree in the left of the game screen. If the player collects five or more of the same losing game outcomes, either five or more chimp game outcomes (a chimp game outcome is one that includes three chimp symbols) or five or more ape game outcomes (an ape game outcome is one that includes three ape symbols), the player is eligible for a bonus award. The rules of the game require that the five losing outcomes all be of the same type, for example, all chimps, with none of the other losing type occurring. Winning game outcomes do not affect the bonus standing.

Figure 2:
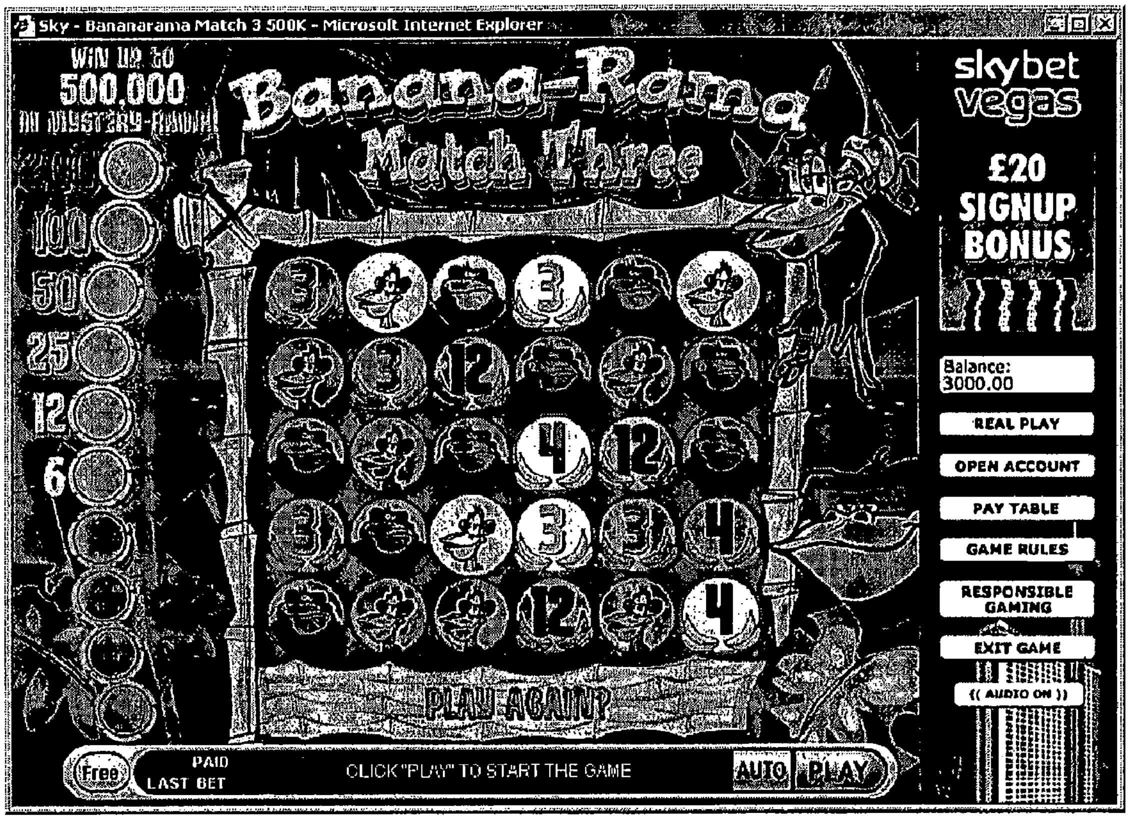
FIGS. 2-9 are screen shots of a series of games for which there is an award based on a multiplicity of game outcomes.
Figure 3:
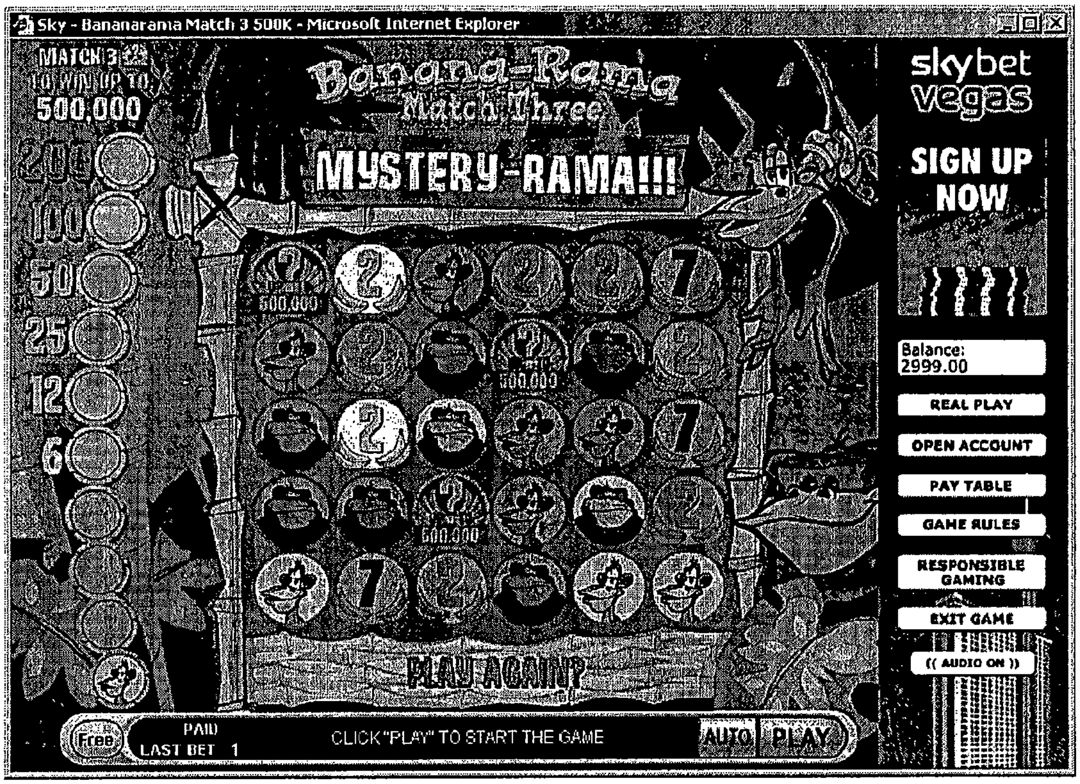

FIG. 2 shows a screen shot a game where the bonus accumulator is empty. FIG. 3 shows a screen shot of a subsequent game where the player matches three chimp symbols, which is a non-paying game outcome. However, this game outcome does lead to a chimp symbol being added to the accumulator.

Figure 4:
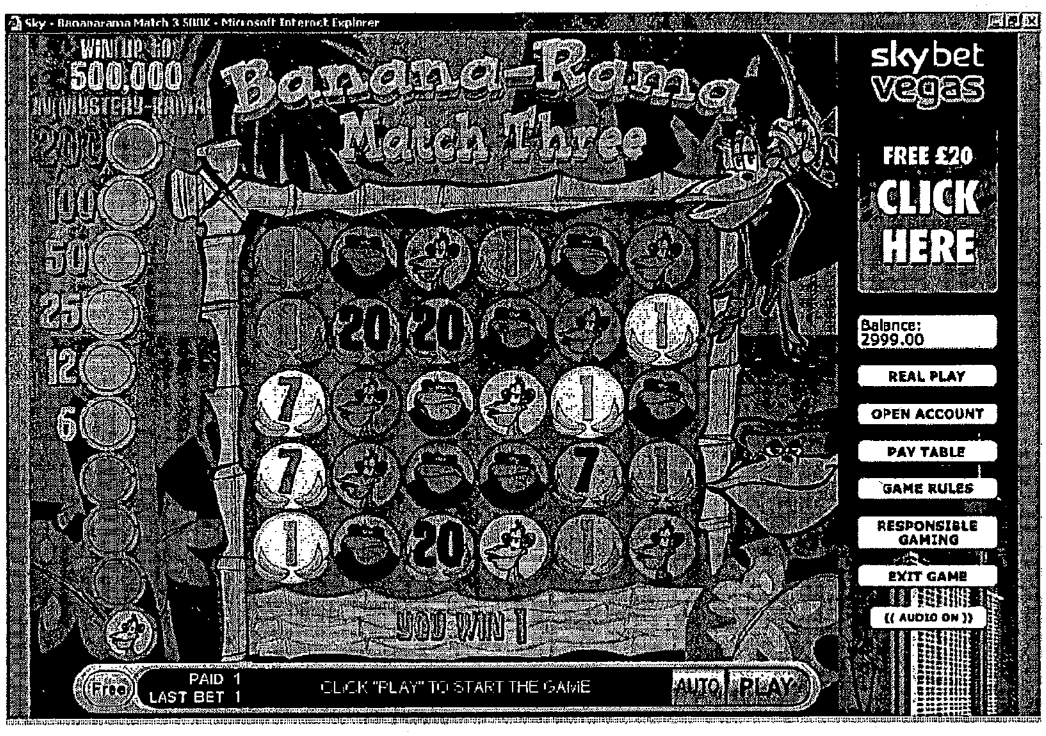

FIG. 4 shows a screen shot of a subsequent game in which the player matches three "1" symbols leading to a payout of, 1 credit. A winning outcome, in this game, does not affect the bonus accumulator for the player. The single chimp from the game of FIG. 3 remains in the bonus accumulator. Only losing game outcomes affect the bonus accumulator.

Figure 5:

FIG. 5 shows a screen shot of a subsequent game in which the player matches another three chimp symbols. Because there is already a chimp in the bonus accumulator, another chimp is added to the accumulator. The player now needs only three more chimp outcomes, without any intervening ape outcomes, to qualify for a bonus.

Figure 6:
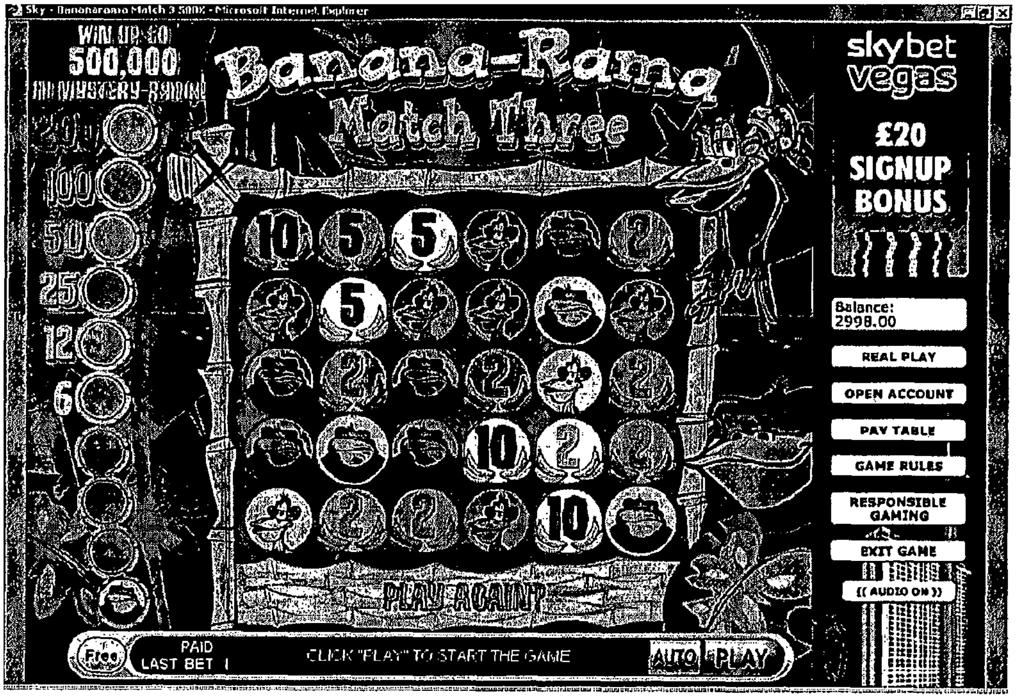

FIG. 6 shows a screen shot of a subsequent game in which the player matches three ape symbols. The game outcome here causes the two chimps in the accumulator shown in FIG. 5 to be replaced by a single ape.

Figure 7:
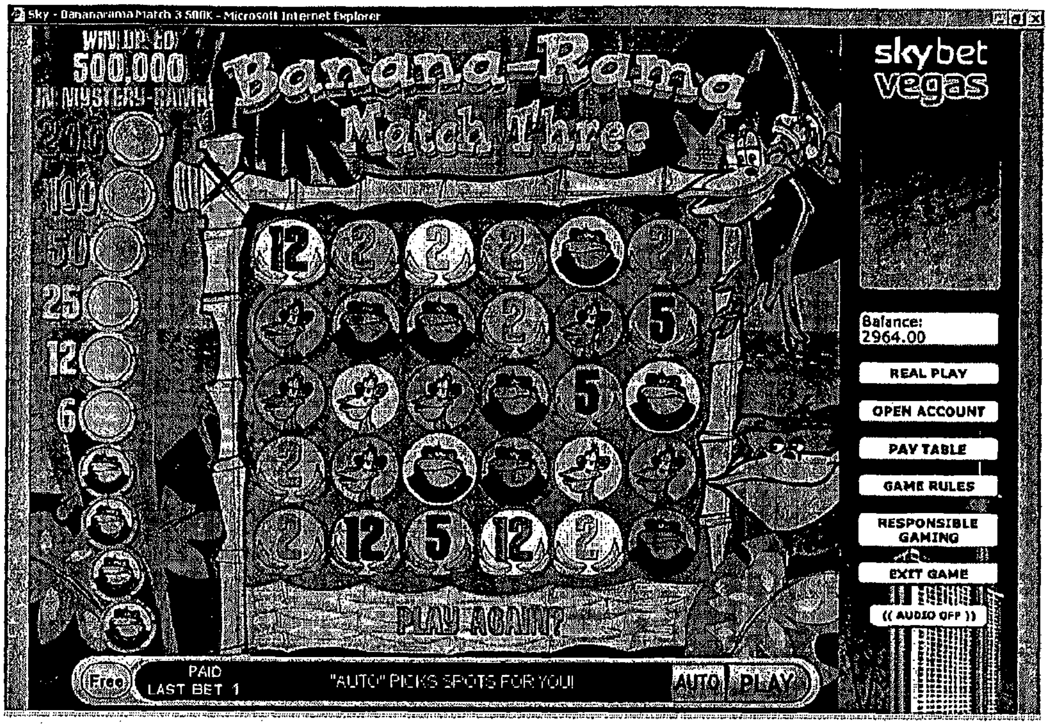

FIG. 7 shows a screen shot of a subsequent in which the player has had four losing ape outcome without an intervening losing chimp outcome. There are thus four ape symbols in the accumulator.

Figure 8:

FIG. 8 shows a screen shot of a subsequent game in which the player matches another three ape symbols, making this game outcome his fifth-in-a-row losing ape outcome without an intervening losing chimp outcome. The player has now earned a bonus opportunity. In this example game, the games rules are defined to allow the player to collect his bonus award or to risk it try for a higher award. A different game can be defined where the player is simply awarded a bonus award for each level he attains with no decision or risk involved.

Figure 9:
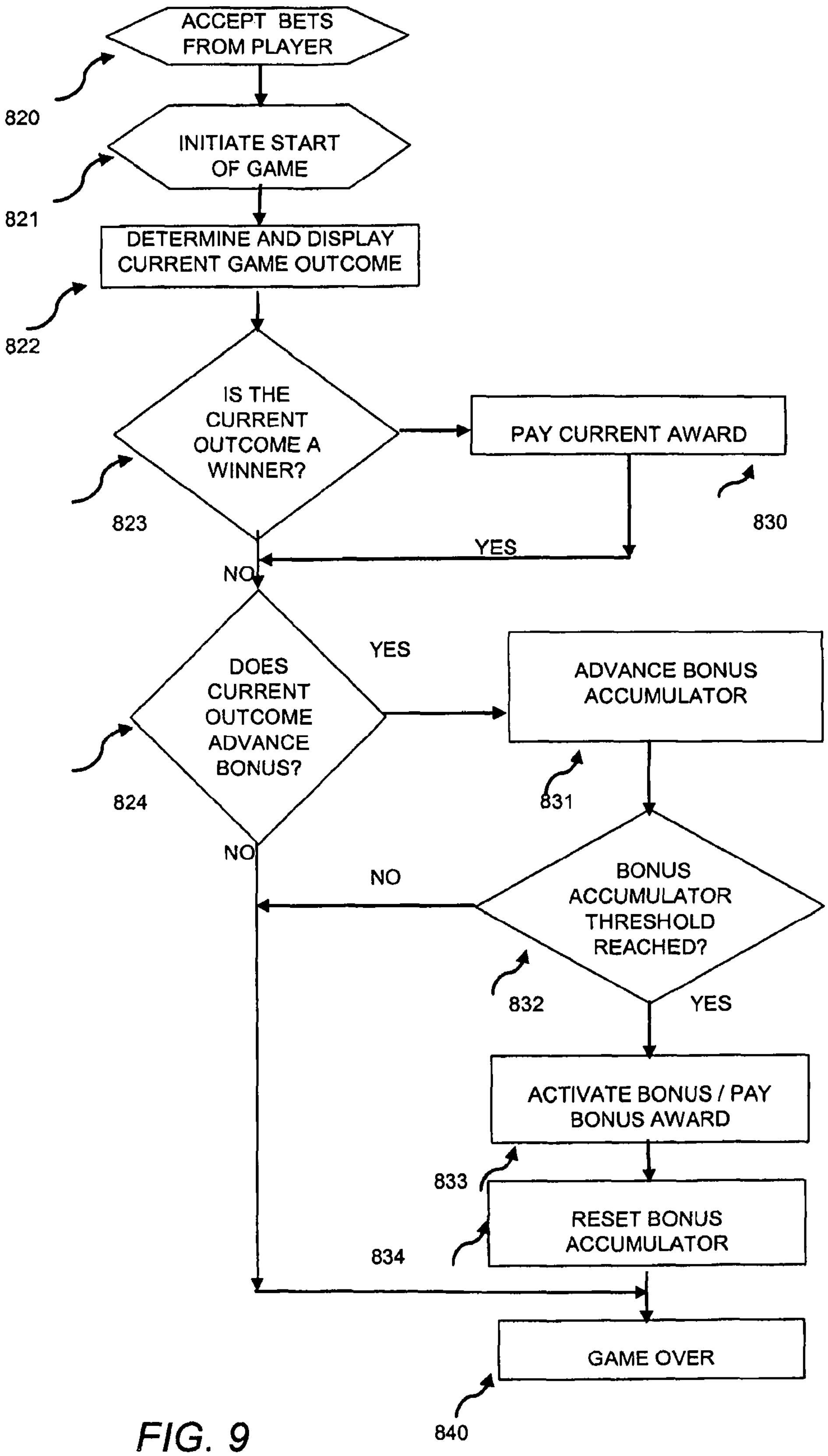

FIG. 9 shows a method for executing the above-described game. A device executing the game receives a wager from the player (step 820) and initiates a current game (step 821). An outcome for the current game, i.e., a current game outcome, is generated and displayed (step 822). The device determines whether the current game outcome is a direct winner (step 823). If the current game outcome is a direct winner, the player is paid accordingly (step 830). If the current game outcome is not a direct winner, the device determines whether the current game outcome advances the bonus status (step 824). If device determines that the current game outcome does not advance the bonus status, then the current game is over (step 840). If device determines that the current game outcome advances the bonus status, the bonus status is updated accordingly (step 831). The device determines whether the advancement causes the bonus status to advance sufficiently, for example, reach a threshold (step 832). If the advancement does cause the status to advance sufficiently, a bonus event occurs leading to a bonus award being paid (step 833) and the bonus status is reset (step 834). If the advancement was insufficient, then the game is over (step 840).

Figure 10:
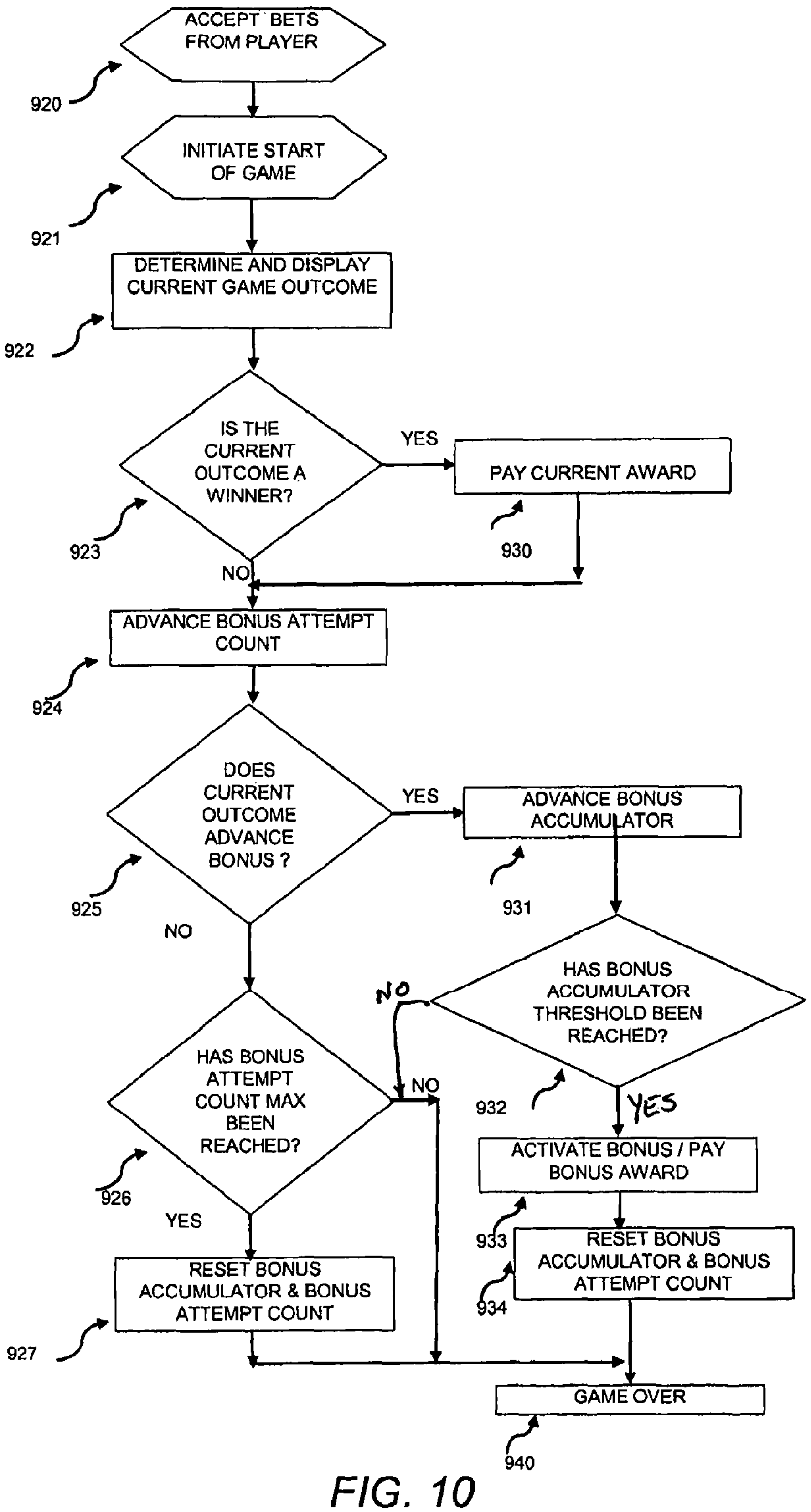
FIG. 10 is a method for executing a game having an award based on a multiplicity of game outcomes.

FIG. 10 shows a method for executing an alternative of the above-described game. In this alternative, the player is only allotted a certain number of tries to attain the bonus. For every game, the bonus attempt count is updated. The device executing the game receives a wager from the player (step 920) and initiates a current game (step 921). An outcome for the current game, i.e., a current game outcome, is generated and displayed (step 922). The device determines whether the current game outcome is a direct winner (step 923). If the current game outcome is a direct winner, the player is paid accordingly (step 930). Otherwise, the player is not. paid. The bonus attempt count is updated (step 924).

The device determines whether the game outcome advances the bonus status (step 925). If the device determines that the game outcome advances the bonus accumulator, then the device advances the bonus accumulator (step 931) and determines whether a bonus award threshold has been reached (step 932). If yes, then the device activates and pays the player the bonus award (step 933) and rests the bonus accumulator and bonus attempt count (step 934). If the bonus award has not been reached, then the device ends the game.

If the device determines that the game outcome does not advance the bonus status (NO branch of step 925), then the device determines whether a maximum has been reached for the bonus attempt count (step 926). If yes, the device resets the bonus accumulator (step 927). If no, the device ends the game without resetting the bonus accumulator.

Figure 11:
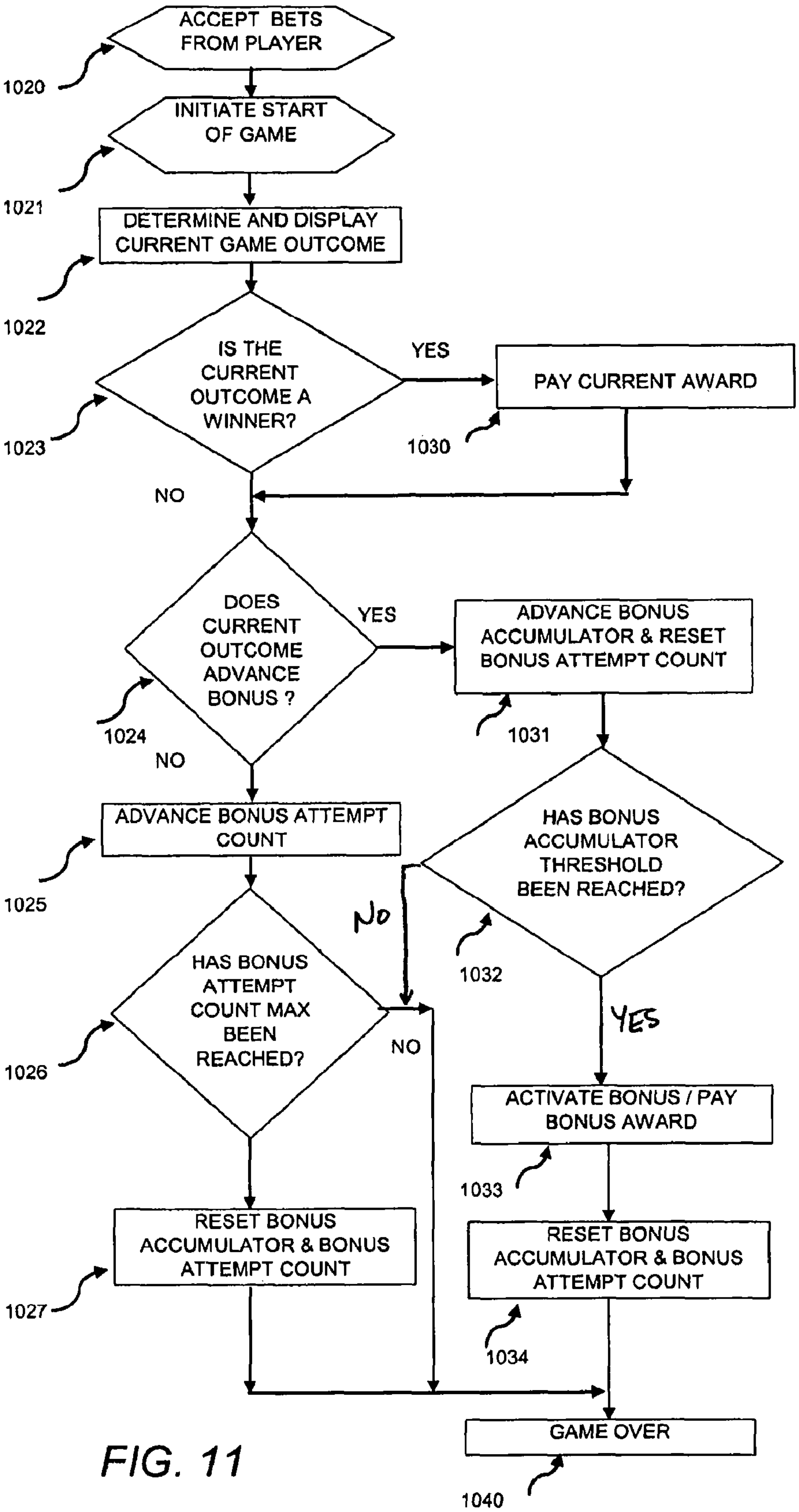
FIG. 11 is a method for executing an alternative of the game.

FIG. 11 shows a method for executing another alternative of the above-described game. The alternative is similar to the process of FIG. 10. Instead of having to achieve the bonus within a certain number of tries, however, the player in this game merely has to advance the bonus within a certain number of tries.

Figure 12:
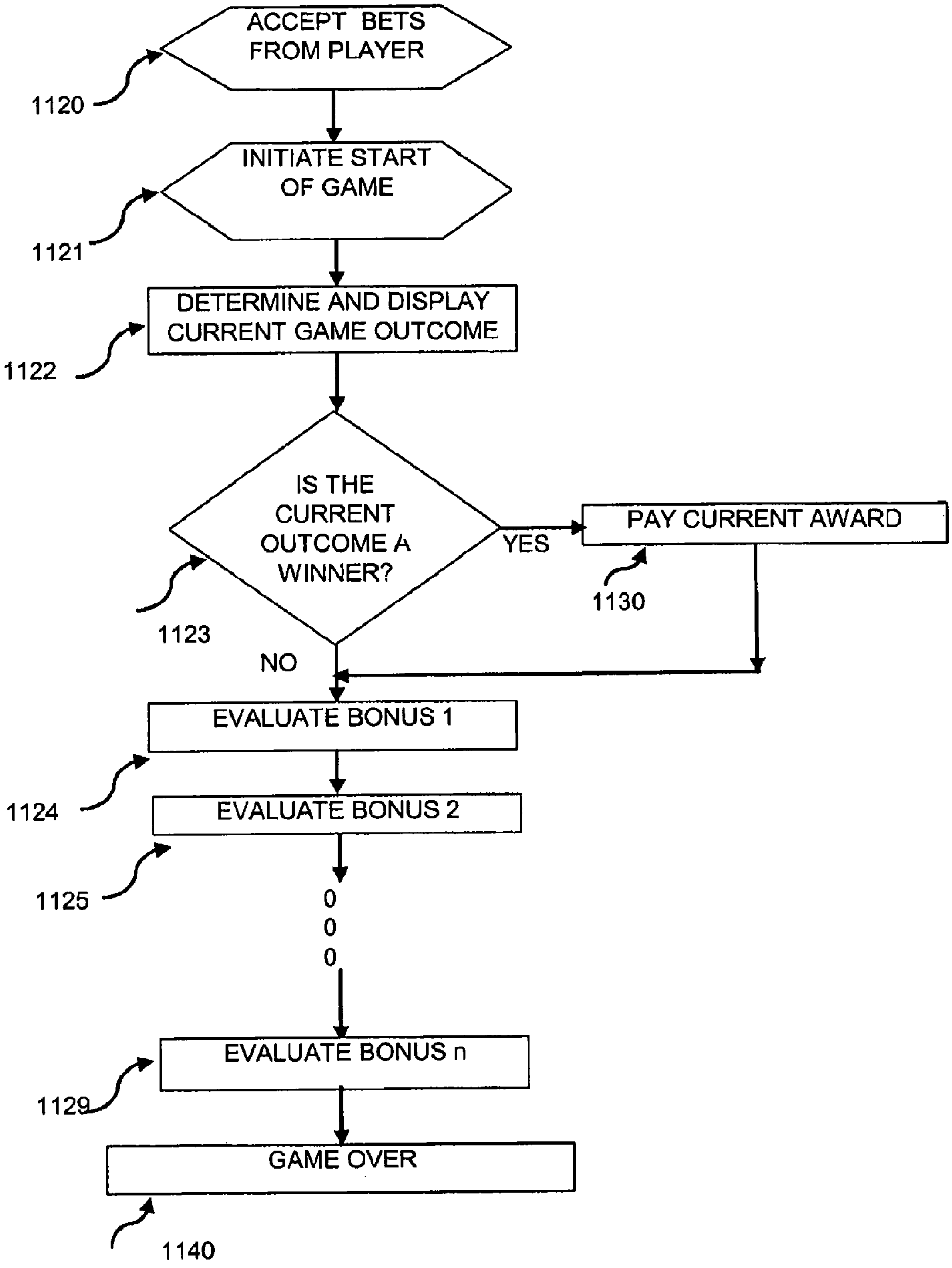
FIG. 12 is a method for executing an alternative of the game.

The methods described in FIGS. 9-11 can also apply to games that have a plurality of independent bonuses. For example, FIG. 12 shows a method for executing an alternative that has two or more bonuses. After the main game outcome is evaluated in step 1122 and any main game award is paid in step 1130, the device independently evaluates the bonuses. Steps 1124-1129 each evaluate one of the one or more bonuses. Evaluation of the bonuses can be performed as described above.

Figure 13:
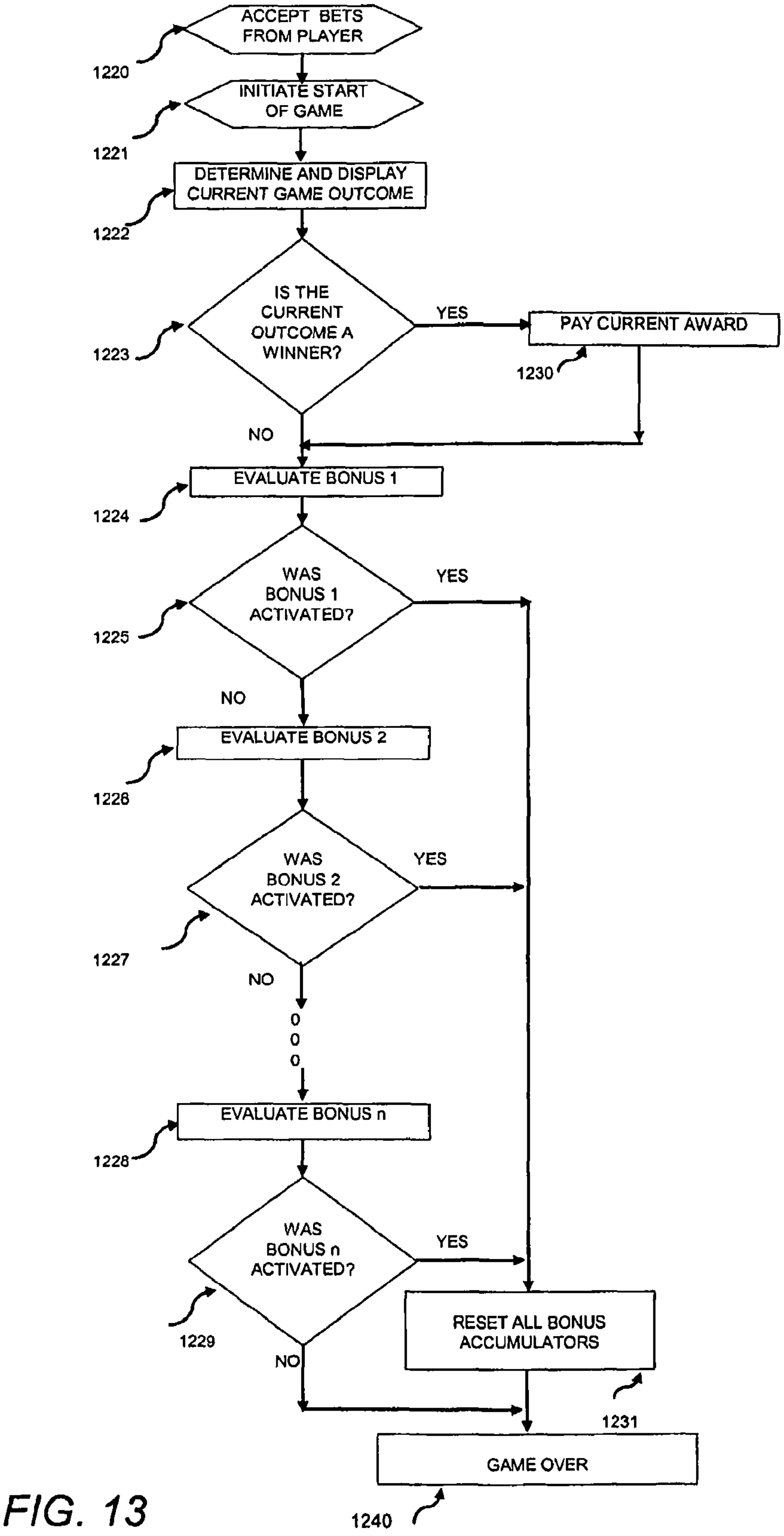
FIG. 13 is a method for executing an alternative of the game.

FIG. 13 shows a method for executing an alternative of the above-described game where there is a plurality of interdependent bonus accumulators. If one accumulator reaches a threshold, which causes a bonus event to be activated, then all bonus accumulators are reset. Each bonus evaluation includes a step (e.g., steps 1225, 1227, and 1229) in which the device determines if a bonus award has been activated. If there has been a bonus award activated, then all bonus accumulators are reset (step 1231) and the game ends (1240).

The above described methods can also apply to networked games where a plurality of players shares the same bonus accumulator and, when appropriate, they may share the same bonus try counter.

The following paragraphs describe other games that provide an award based on a multiplicity of game outcomes. In one or more of the following implementations, methods and apparatus are designed to provide for a viable casino game. Viability can require, for example, that the overall payback not exceed one hundred percent, the payback being the overall amount returned to players. Viability can also require, for example, that: the overall payback must comply with regulatory requirements of the jurisdiction in which the game is offered; the overall payback is acceptable in view of the marketplace (e.g., 88% to 96% for an initial target market); the game provides sufficient hit frequency, i.e., the rate of awards given to a player (e.g., every 2 to 5 minutes of play for small awards of 2x to 20x, or every 5 to 10 minutes for large awards of 15x to 50x, where x is the denomination); and the game provides sufficiently high awards to attract players, for example, awards of 50x to 100x.

One aspect of the invention can be implemented in the context of network casino gaming. For example, in a networked video poker game where the person who gets the 10th 3 of a kind outcome across all players wins a bonus.

In one implementation, a bonus game or round can be initiated upon achieving n consecutive winning outcomes instead of, or in addition to, the bonus award. Another implementation provides bonus awards or bonus round activation when a player achieves n outcomes in n+k tries, where k is some number greater than or equal to zero. For example, a player can receive a bonus award or round if seven of the previous ten plays produced eligible outcomes. In this implementation, the n outcomes need not be consecutive. Eligible outcomes can be winning outcomes or based on some other criteria.

One implementation bases an award or bonus round activation upon attaining n outcomes prior to some particular event occurring. In this implementation, the n outcomes do not need to be consecutive. For example, in the Blackjack context, a bonus award or round can be earned if a player achieves n Blackjack hands before the dealer gets one Blackjack. In another example, a bonus award or round can be earned when the player achieves three hands totaling twenty-one before the dealer gets two Blackjacks. In another example, multiple pays can be included such that getting three totals of twenty-one prior to the dealer getting two Blackjacks, as in the previous example, results in a certain bonus award or round but each additional total of twenty-one attained prior to the dealer getting a Blackjack results in an additional bonus award or round.

Another implementation of the invention allows for k independent awards that a player is vying for, xl, x2, . . . xk, based on whether the player achieves nl, n2, . . . nk outcomes ol, o2, . . . ok. For example, in a video poker game there are several different possible hands or outcomes, each having a different relative value based on the probability of achieving that hand. In this implementation, each hand or outcome will have a certain associated n value representing the number of times that outcome must be achieved in order to win the award associated with that outcome. The n value must be reached before the n value associated with the other outcomes. Whichever n value is reached for a particular outcome first, the bonus award or round associated with that outcome is attained.

For example, if the n value of the outcome of two pairs is 50, a player must get two pairs 50 times before achieving the required n level for any of the other entries to win the bonus award or round associated with two pairs. (The count represents the number of times a player has received a particular outcome.) In one implementation, reaching the award level for one outcome resets the count in all outcome events to zero such that bonus opportunities start anew for each outcome event. Alternatively, only the count for the achieved event is reset to zero and the counts for each other outcome event remain as they were prior to the achieved count. For example, if upon reaching 50 two-pair outcomes a player also has twenty three-of-a-kind outcomes, the award is given for the 50 two-pair outcomes, the count for the two-pair outcomes is reset, and the count for the three-of-a-kind outcomes stays at twenty. The player can, thus, continue advancing the three-of-a-kind count towards its n value, which can be, for example, thirty.

In one implementation, independent counts can be maintained towards different outcomes as in the previous example, except that the outcomes can overlap. For example, a Full House would also be counted as a Three-of-a-kind, and if the pair in the Full House were Jacks or Better, then Jacks or Better would also be credited as another outcome. Thus, the count in each outcome of Full House, Three-of-a-kind, and Jacks or Better would increase by one.

Where gaming is implemented over a network, players can compete against each other to reach n outcomes in order to attain a bonus award or bonus round play. For example, in the implementation where a player gets a bonus award or round for reaching n outcomes before the dealer attains a particular event or combination of events, there can be competition between other players to reach n first. If twenty players are in a pool playing Blackjack there can be some n number of Blackjacks that a player must attain prior to the dealer getting some number y of Blackjacks. The players compete against each other to be the first to reach n and, thus, win a bonus award or round before the dealer reaches y Blackjacks. For a further example, the compete feature can also be implemented in the case of independent awards. If twenty players are within a pool playing video poker, there is an n value for outcomes such as a Full House. The twenty players in the pool compete to reach the n value for any outcome prior to the other players.

In one implementation, games provide variable outcome bonuses. A player is allowed to purchase a chance to win one or more bonus awards. That is, the player is allowed to purchase bonus award opportunities. For example, where wagering one to five coins provides a player with normal play, wagering a sixth coin provides play with one or more bonus award opportunities. Alternatively, opportunities for bonus awards can be provided if a maximum wager amount is placed (e.g., five coins wagered in the above described five coin game) or as a result of a normal wager (e.g., one to five coins wagered in the above described five coin game). Buy-a-pay match poker, accumulated win poker, and multi-strike poker are examples of games that provide variable outcome bonuses. The games mentioned above and their variations are described below.

Buy-a-pay match poker provides additional bonus award opportunities when an additional coin is wagered. For example, where wagering one to five coins provides a player with normal play, a sixth coin wagered provides play with, for example, a bonus multiplier for a winning outcome (two pairs, three of a kind, a flush, and so forth).

Accumulated win poker counts the number of time a player achieves a particular winning outcome and provides a bonus award when the count (i.e., the bonus accumulator) reaches a certain threshold number. Accumulated win poker can include bonus accumulators for multiple and different winning outcomes. For example, a bonus accumulator can be provided for each of a flush outcome and a two pair outcome. The bonus award can be given when one or any combination of bonus accumulators reach their respective threshold count (i.e., the accumulators are filled). The bonus award can be a fixed payout amount, a random payout amount, a payout amount that is based on the outcome, a multiplier of a non-bonus award, a bonus round, advancement to a bonus round, an increase in an accumulated awards such as a jackpot, and any combination of the examples of bonus awards described. For the disposition of the game after a bonus award is given, all bonus accumulators is reset after any bonus awards given. Alternatively, the game can reset only the bonus accumulator that has been filled and maintain the count in the other bonus accumulators The game can provide an indication of the progress of a bonus accumulator by, for example, displaying a count next to the winning outcome. The bonus opportunities can be provided when a maximum wager is placed. Alternatively, the bonus opportunities can be provided when a wager amount above the maximum amount for normal play is placed.

In multi-strike star poker, if a player achieves a particular outcome better than or equal to a threshold outcome (e.g., flush or better), then the particular outcome is assigned a certain number of stars. Every time another winning outcome occurs, one of the stars is taken away. If the player hits the particular outcome again before all the stars are taken away, then the player is given a bonus award. Alternatively, 2x symbols can be displayed instead of stars. Should the particular winning outcome re-occurs before all of the 2x symbols are taken away, the player receives an award multiplier that is the product (or alternatively the sum) of the remaining 2x symbols.

For the above described games that provide variable outcome bonuses, a bonus award can be a fixed payout amount, a random payout amount, a payout amount that is based on the outcome, a multiplier of a non-bonus award, a bonus round, advancement to a bonus round, an increase in an accumulated awards such as a jackpot, and any combination of the examples of bonus awards described. Furthermore, the size or type of bonus award can vary based on the winning outcome. For example, the bonus award for a royal flush can be greater than the bonus award for a three of a kind. The bonus award can vary from wager to wager (i.e., from proposition to proposition). The bonus award can be based on previous outcomes.

The invention can be implemented as a traditional table game, or in digital electronic circuitry, or in computer hardware, firmware, software, or in combinations of them. Apparatus of the invention can be implemented in a computer program product tangibly embodied in a machine-readable storage device for execution by a programmable processor; and method steps in the invention can be performed by a programmable processor execution a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and optical disks. Any of the foregoing can be supplemented by, or incorporated in, ASICs (application-specific integrated circuits).

To provide for interaction with a user, the invention can be implemented on a computer system having a display device such as a monitor or LCD screen for displaying information tot eh user and a keyboard and a pointing device such as a mouse or trackball by which the user can provide input to the computer system. The computer system can be programmed to provide a graphical user interface though which computer programs interact with users.

The computing system can include clients and servers. A client and server are generally remote from each other and typically interact through a communication network. The relationship of client and server arises by virtue of computer programs running on the respective computers and having a client-server relationship to each other. This can, for example, include an Internet-based implementation.

A number of implementations of the invention have been described. Nevertheless, it will be understood that various modifications may be made without departing from the spirit and scope of the invention. For example, the steps for the methods can be performed in a different order. The criteria for main game awards and bonus awards can be defined in a same pay model or in separate pay models.

The invention is claimed as follows:

1. A gaming system comprising:

a plurality of gaming devices, each gaming device including:

at least one input device, at least one display device, at least one processor, and at least one memory device which stores a plurality of instructions, which when executed by the at least one processor, cause the at least one processor to operate with the at least one display device and the at least one input device to:

(a) enable a player to place a wager on a play of a wagering game, (b) generate a game outcome from a plurality of game outcomes, (c) display to the player the generated game outcome, and (d) provide to the player any award associated with the generated game outcome;

at least one server configured to operate with the plurality of gaming devices, said at least one server programmed to:

(a) determine if any of the generated game outcomes of any of the gaming devices are associated with a first counter modification condition, (b) if one of the generated game outcomes of one of the gaming devices is associated with the first counter modification condition:

(i) add a count to a counter, said counter associated with each of the gaming devices, (ii) cause a display of the total count of the counter in association with each of the gaming devices, and (iii) if the total count of the counter reaches a designated count, provide a counter modification award to the player of the gaming device which generated the game outcome associated with the first counter modification condition, (c) determine if any of the generated game outcomes of any of the gaming devices are associated with a second, different counter modification condition, and (d) if one of the generated game outcomes of one of the gaming devices is associated with the second counter modification condition:

(i) reset the counter, and (ii) cause a display of the reset counter in association with each of the gaming devices.

2. The gaming system of claim 1, wherein the counter modification award is at least one selected from the group consisting of: a static award amount, a random award amount, an award amount that is based on at least one of the generated game outcomes, a multiplier of a non-bonus award, a bonus round, an advancement to the bonus round, and an increase in a progressive award.

3. The gaming system of claim 1, wherein the first counter modification condition is associated with the generation of a first losing game outcome and the second counter modification condition is associated with the generation of a second, different losing game outcome.

4. The gaming system of claim 3, wherein if one of the generated game outcomes of one of the gaming devices is the second losing game outcome, the at least one server is programmed to set the counter to a designated value of at least one in association with the second losing game outcome.

5. The gaming system of claim 1, wherein the at least one server is programmed to enable each of the players of each of the gaming devices to place a supplemental wager to be eligible for the counter modification award.

6. A gaming system comprising:

at least one input device;

at least one display device;

at least one processor; and at least one memory device which stores a plurality of instructions, which when executed by the at least one processor, cause the at least one processor to operate with the at least one display device and the at least one input device to:

(a) enable a player to place a wager on a play of a wagering game, (b) generate a game outcome from a plurality of game outcomes, (c) display to the player the generated game outcome, (d) provide to the player any award associated with the generated game outcome, (e) determine if the generated game outcome is associated with a first counter modification condition of a first counter, (f) if the generated game outcome is associated with the first counter modification condition of the first counter:

(i) add a count to the first counter, (ii) display a total count of the first counter, and (iii) if the total count of the first counter reaches a first designated count, provide to the player a first counter modification award, (g) determine if the generated game outcome is associated with a first counter modification condition of a second, different counter, (h) if the generated outcome is associated with the first counter modification condition of the second counter:

(i) add a count to the second counter, (ii) display a total count of the second counter, and (iii) if the total count of the second counter reaches a second designated count, provide to the player a second counter modification award, (i) determine if the generated game outcome is associated with at least one of: a second, different counter modification condition of the first counter and a second, different counter modification condition of the second counter, and (j) if the generated game outcome is associated with at least one of: the second, different counter modification condition of the first counter and the second, different counter modification condition of the second counter:

(i) reset the first counter, (ii) reset the second counter, and (iii) display the reset first counter and the reset second counter.

7. The gaming system of claim 6, wherein the first designated count is different than the second designated count.

8. The gaming system of claim 6, wherein when executed by the at least one processor, the plurality of instructions cause the at least one processor to reset the first counter and the second counter if the total count of the first counter reaches the first designated count.

9. The gaming system of claim 6, wherein when executed by the at least one processor, the plurality of instructions cause the at least one processor to reset the first counter and the second counter if the total count of the second counter reaches the second designated count.

10. The gaming system of claim 6, wherein at least one of the first counter modification award and the second counter modification award is at least one selected from the group consisting of: a static award amount, a random award amount, an award amount that is based on at least one of the generated game outcomes, a multiplier of a non-bonus award, a bonus round, an advancement to the bonus round, and an increase in a progressive award.

11. The gaming system of claim 6, wherein the first counter modification condition of the first counter is associated with the generation of a first losing game outcome and the second counter modification condition of the first counter is associated with the generation of a second, different losing game outcome.

12. The gaming system of claim 11, wherein the first counter modification condition of the second counter is associated with the generation of a third, different losing game outcome and the second counter modification condition of the second counter is associated with the generation of a fourth, different losing game outcome.

13. The gaming system of claim 6, wherein when executed by the at least one processor, the plurality of instructions cause the at least one processor to enable the player to place a supplemental wager to be eligible for at least one of the first counter modification award and the second counter modification award.

14. A gaming system comprising:

at least one input device;

at least one display device;

at least one processor; and at least one memory device which stores a plurality of instructions, which when executed by the at least one processor, cause the at least one processor to operate with the at least one display device and the at least one input device to:

(a) enable a player to place a wager on a play of a wagering game, (b) generate a game outcome from a plurality of game outcomes, (c) display to the player the generated game outcome, (d) provide to the player any award associated with the generated game outcome, (e) if the generated game outcome is a first losing game outcome:

(i) add a count to a counter associated with the first losing game outcome, (ii) display a total count of the counter associated with the first losing game outcome, and (iii) if the total count of the counter reaches a designated count, provide to the player a counter modification award, and (f) if the generated game outcome is associated with a second, different losing game outcome:

(i) reset the counter associated with the first losing game outcome, (ii) reassociate the counter with the second losing game outcome, (iii) add a counter to the counter reassociated with the second losing game outcome, and (iv) display a total count of the counter reassociated with the second losing game outcome.

15. The gaming system of claim 14, wherein when executed by the at least one processor, the plurality of instructions cause the at least one processor to reset the counter if the total count of the counter reaches the designated count.

16. The gaming system of claim 14, wherein the counter modification award is at least one selected from the group consisting of: a static award amount, a random award amount, an award amount that is based on at least one of the generated game outcomes, a multiplier of a non-bonus award, a bonus round, an advancement to the bonus round, and an increase in a progressive award.

17. The gaming system of claim 14, wherein when executed by the at least one processor, the plurality of instructions cause the at least one processor to enable the player to place a supplemental wager to be eligible for the counter modification award.

18. A method of operating a gaming system, said method comprising:

(a) causing each of a plurality of gaming devices (i) enable a player to place a wager on a play of a wagering game, (ii) generate a game outcome from a plurality of game outcomes, (iii) display to the player the generated game outcome, and (iv) provide to the player any award associated with the generated game outcome;

(b) causing the at least one server to execute a plurality of instructions to determine if any of the generated game outcomes of any of the gaming devices are associated with a first counter modification condition, (c) if one of the generated game outcomes of one of the gaming devices is associated with the first counter modification condition:

(i) causing the at least one server to execute the plurality of instructions to add a count to a counter, said counter associated with each of the gaming devices, (ii) causing a display of the total count of the counter in association with each of the gaming devices, and (iii) if the total count of the counter reaches a designated count, providing a counter modification award to the player of the gaming device which generated the game outcome associated with the first counter modification condition, (d) causing the at least one server to execute the plurality of instructions to determine if any of the generated game outcomes of any of the gaming devices are associated with a second, different counter modification condition, and (e) if one of the generated game outcomes of one of the gaming devices is associated with the second counter modification condition:

(i) causing the at least one server to execute the plurality of instructions to reset the counter, and (ii) causing a display of the reset counter in association with each of the gaming devices.

19. The method of claim 18, wherein the counter modification award is at least one selected from the group consisting of: a static award amount, a random award amount, an award amount that is based on at least one of the generated game outcomes, a multiplier of a non-bonus award, a bonus round, an advancement to the bonus round, and an increase in a progressive award.

20. The method of claim 18, wherein the first counter modification condition is associated with the generation of a first losing game outcome and the second counter modification condition is associated with the generation of a second, different losing game outcome.

21. The method of claim 20, which includes causing the at least one server to execute the plurality of instructions to set the counter to a designated value of at least one in association with the second losing game outcome if one of the generated game outcomes of one of the gaming devices is the second losing game outcome.

22. The method of claim 18, which includes enabling each of the players of each of the gaming devices to place a supplemental wager to be eligible for the counter modification award.

23. The method of claim 18, which is provided through a data network.

24. The method of claim 23, wherein the data network is an Internet.

25. A method of operating a gaming system, said method comprising:

(a) enabling a player to place a wager on a play of a wagering game, (b) causing at least one processor to execute a plurality of instructions to generate a game outcome from a plurality of game outcomes, (c) causing at least one display device to display to the player the generated game outcome, (d) providing to the player any award associated with the generated game outcome, (e) causing the at least one processor to execute the plurality of instructions to determine if the generated game outcome is associated with a first counter modification condition of a first counter, (f) if the generated game outcome is associated with the first counter modification condition of the first counter:

(i) causing the at least one processor to execute the plurality of instructions to add a count to the first counter, (ii) causing the at least one display device to display a total count of the first counter, and (iii) if the total count of the first counter reaches a first designated count, providing to the player a first counter modification award, (g) causing the at least one processor to execute the plurality of instructions to determine if the generated game outcome is associated with a first counter modification condition of a second, different counter, (h) if the generated outcome is associated with the first counter modification condition of the second counter:

(i) causing the at least one processor to execute the plurality of instructions to add a count to the second counter, (ii) causing the at least one display device to display a total count of the second counter, and (iii) if the total count of the second counter reaches a second designated count, providing to the player a second counter modification award, (i) causing the at least one processor to execute the plurality of instructions to determine if the generated game outcome is associated with at least one of: a second, different counter modification condition of the first counter and a second, different counter modification condition of the second counter, and (j) if the generated game outcome is associated with at least one of: the second, different counter modification condition of the first counter and the second, different counter modification condition of the second counter:

(i) causing the at least one processor to execute the plurality of instructions to reset the first counter, (ii) causing the at least one processor to execute the plurality of instructions to reset the second counter, and (iii) causing the at least one display device to display the reset first counter and the reset second counter.

26. The method of claim 25, wherein the first designated count is different than the second designated count.

27. The method of claim 25, which includes causing the at least one processor to execute the plurality of instructions to reset the first counter and the second counter if the total count of the first counter reaches the first designated count.

28. The method of claim 25, which includes causing the at least one processor to execute the plurality of instructions to reset the first counter and the second counter if the total count of the second counter reaches the second designated count.

29. The method of claim 25, wherein at least one of the first counter modification award and the second counter modification award is at least one selected from the group consisting of: a static award amount, a random award amount, an award amount that is based on at least one of the generated game outcomes, a multiplier of a non-bonus award, a bonus round, an advancement to the bonus round, and an increase in a progressive award.

30. The method of claim 25, wherein the first counter modification condition of the first counter is associated with the generation of a first losing game outcome and the second counter modification condition of the first counter is associated with the generation of a second, different losing game outcome.

31. The method of claim 30, wherein the first counter modification condition of the second counter is associated with the generation of a third, different losing game outcome and the second counter modification condition of the second counter is associated with the generation of a fourth, different losing game outcome.

32. The method of claim 25, which includes enabling the player to place a supplemental wager to be eligible for at least one of the first counter modification award and the second counter modification award.

33. The method of claim 25, which is provided through a data network.

34. The method of claim 33, wherein the data network is an Internet.

35. A method of operating a gaming system, said method comprising:

(a) enabling a player to place a wager on a play of a wagering game, (b) causing at least one processor to execute a plurality of instructions to generate a game outcome from a plurality of game outcomes, (c) causing at least one display device to display to the player the generated game outcome, (d) providing to the player any award associated with the generated game outcome, (e) if the generated game outcome is a first losing game outcome:

(i) causing the at least one processor to execute the plurality of instructions to add a count to a counter associated with the first losing game outcome, (ii) causing the at least one display device to display a total count of the counter associated with the first losing game outcome, and (iii) if the total count of the counter reaches a designated count, providing to the player a counter modification award, and (f) if the generated game outcome is associated with a second, different losing game outcome:

(i) causing the at least one processor to execute the plurality of instructions to reset the counter associated with the first losing game outcome, (ii) causing the at least one processor to execute the plurality of instructions to reassociate the counter with the second losing game outcome, (iii) causing the at least one processor to execute the plurality of instructions to add a counter to the counter reassociated with the second losing game outcome, and (iv) causing the at least one display device to display a total count of the counter reassociated with the second losing game outcome.

36. The method of claim 35, which includes causing the at least one processor to execute the plurality of instructions to reset the counter if the total count of the counter reaches the designated count.

37. The method of claim 35, wherein the counter modification award is at least one selected from the group consisting of: a static award amount, a random award amount, an award amount that is based on at least one of the generated game outcomes, a multiplier of a non-bonus award, a bonus round, an advancement to the bonus round, and an increase in a progressive award.

38. The method of claim 35, which includes enabling the player to place a supplemental wager to be eligible for the counter modification award.

39. The method of claim 35, which is provided through a data network.

40. The method of claim 39, wherein the data network is an Internet.

* * * * *

UNITED STATES PATENT AND TRADEMARK OFFICE
CERTIFICATE OF CORRECTION

PATENT NO. : 8,388,437 B2
APPLICATION NO. : 13/178246
DATED : March 5, 2013
INVENTOR(S) : Mark C. Nicely et al.

It is certified that error appears in the above-identified patent and that said Letters Patent is hereby corrected as shown below:

IN THE CLAIMS

In Claim 1, Column 11, Line 21, after “outcome;” insert --and--.
In Claim 1, Column 11, Line 33, replace the first instance of “the” with --a--.
In Claim 6, Column 12, Line 33, between “generated” and “outcome” insert --game--.
In Claim 10, Column 13, Line 3, delete “at least one of”.
In Claim 10, Column 13, Line 4, replace “outcomes” with --outcome--.
In Claim 14, Column 13, Line 56, replace the first instance of “counter” with --count--.
In Claim 16, Column 13, Line 67, delete “at least one of”.
In Claim 16, Column 14, Line 1, replace “outcomes” with --outcome--.
In Claim 18, Column 14, Line 11, after “devices” insert --to:--.
In Claim 18, Column 14, Line 21, delete “the”.
In Claim 18, Column 14, Line 31, replace the first instance of “the” with --a--.
In Claim 24, Column 15, Line 8, replace “Internet” with --internet--.
In Claim 25, Column 15, Line 39, between “generated” and “outcome” insert --game--.
In Claim 29, Column 16, Line 13, delete “at least one of”.
In Claim 29, Column 16, Line 14, replace “outcomes” with --outcome--.
In Claim 34, Column 16, Line 37, replace “Internet” with --internet--.
In Claim 35, Column 17, Line 2, replace the first instance of “counter” with --count--.
In Claim 37, Column 18, Line 1, delete “at least one of”.
In Claim 37, Column 18, Line 2, replace “outcomes” with --outcome--.
In Claim 40, Column 18, Line 11, replace “Internet” with --internet--.

Signed and Sealed this
Fourteenth Day of May, 2013

Teresa Stanek Rea
*Acting Director of the United States Patent and Trademark Office*